(12) United States Patent
Elija

(10) Patent No.: US 11,066,035 B2
(45) Date of Patent: Jul. 20, 2021

(54) AIRBAG MODULE AND METHOD FOR MOUNTING AN AIRBAG MODULE

(71) Applicant: TRW Automotive GmbH, Alfdorf (DE)

(72) Inventor: Daniel Elija, Schwäbisch-Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 29 days.

(21) Appl. No.: 16/486,512

(22) PCT Filed: Feb. 7, 2018

(86) PCT No.: PCT/EP2018/053018
§ 371 (c)(1),
(2) Date: Aug. 16, 2019

(87) PCT Pub. No.: WO2018/153669
PCT Pub. Date: Aug. 30, 2018

(65) Prior Publication Data
US 2020/0047701 A1 Feb. 13, 2020

(30) Foreign Application Priority Data

Feb. 24, 2017 (DE) .......................... 102017103827.2

(51) Int. Cl.
*B60R 21/217* (2011.01)
*B60R 21/237* (2006.01)

(52) U.S. Cl.
CPC ........ *B60R 21/2176* (2013.01); *B60R 21/237* (2013.01)

(58) Field of Classification Search
CPC .................................................. B60R 21/2176
See application file for complete search history.

(56) References Cited

U.S. PATENT DOCUMENTS

| | | | |
|---|---|---|---|
| 5,820,159 A | 10/1998 | Werner et al. | |
| 9,193,324 B2* | 11/2015 | Osterfeld | ............ B60R 21/2176 |
| 10,384,633 B2* | 8/2019 | Warm | ................. B60R 21/2165 |
| 2007/0064541 A1 | 3/2007 | Kagan | |
| 2010/0314857 A1 | 12/2010 | Rick | |
| 2010/0327565 A1 | 12/2010 | Wagner et al. | |
| 2011/0101657 A1 | 5/2011 | Padiyaer et al. | |
| 2013/0200664 A1* | 8/2013 | Patterson | .............. B60R 21/207 |
| | | | 297/216.1 |
| 2017/0129443 A1 | 5/2017 | Elija et al. | |
| 2020/0290546 A1* | 9/2020 | Freisler | ................. B60R 21/206 |

FOREIGN PATENT DOCUMENTS

| | | |
|---|---|---|
| DE | 10133968 | 2/2003 |
| DE | 102009058704 | 6/2011 |
| DE | 202014006709 | 11/2014 |

* cited by examiner

*Primary Examiner* — Faye M Fleming
(74) *Attorney, Agent, or Firm* — Tarolli, Sundheim, Covell & Tummnio LLP

(57) ABSTRACT

An airbag module (10) comprises a housing (12), a folded airbag (16) and a flexible fixation (14) which fixes the folded airbag (16) on the housing (12). There is provided a tensioning device (24) by which the fixation (14) can be brought from an initial state to a tensioned state. Moreover, a method of mounting an airbag module (10) is provided.

10 Claims, 2 Drawing Sheets

AIRBAG MODULE AND METHOD FOR MOUNTING AN AIRBAG MODULE

RELATED APPLICATIONS

This application corresponds to PCT/EP2018/053018 filed Feb. 7, 2018, which claims the benefit of German Application No. 10 2017 103 827.2 filed Feb. 24, 2017, the subject matter of which are incorporated herein by reference in their entirety.

BACKGROUND OF THE INVENTION

The invention relates to an airbag module comprising a housing, a folded airbag and a flexible fixation that fixes the folded airbag on the housing. Moreover, the invention relates to a method of mounting an airbag module.

Airbag modules, on the one hand, should have a very simple structure and, on the other hand, should ensure a course of deployment of the airbag predetermined within narrow limits upon release. The airbags are typically mounted in a folded state to restrict the space required. It is known from prior art to sheath the folded airbags by means of a shrink hose, for example, and in this manner to maintain them in compact shape which allows defined mounting of the airbag.

It is a drawback of this solution that for sheathing the folded airbag an additional working step involving a specific device is required which results in higher expenditure in manufacturing the airbag module.

SUMMARY OF THE INVENTION

It is the object of the invention to provide an airbag module that has a less complicated design and, at the same time, safeguards defined storage of the airbag. It is a further object of the invention to provide a method of mounting an airbag module by means of which rapid assembly of constantly high quality can be guaranteed.

For achieving the object an airbag module comprising a housing, a folded airbag and a flexible fixation for fixing the folded airbag on the housing is provided. A tensioning device is provided by which the fixation can be brought from an initial state to a tensioned state. In the tensioned state, the tensile stress in the fixation is higher than in the initial state. In this way, a defined tension is provided between the flexible fixation and the airbag, thus causing the airbag to be supported on the housing in a safe and defined manner.

The housing preferably is in the form of a cover from the vehicle interior. Especially in knee airbag modules in the so-called low-mounted position the housing forms the lower side of the airbag module by which the latter points to the footwell. Low-mounted knee airbag modules are arranged to be covered on the lower side of the instrument panel and, resp., above the driver or passenger footwell. The housing and, resp., the cover advantageously has a tearing line that defines the outlet opening of the airbag during deployment.

Preferably, the fixation is formed of a fabric material. Fabric materials offer the advantage that they may show high strength with low mass and can be inexpensively and easily processed.

In an advantageous embodiment, the tensioning device includes a lug. The lug is provided for adjusting the tensioning means from a first position in which the fixation is in the initial state to a second position, with the fixation being transferred to the tensioned state by adjusting. In doing so, the flexible fixation is stretched by a predetermined distance and a defined tension is produced.

The lug may be attached to the housing by means of a hinge so as to provide defined folding of the lug. As the lug can be adjusted by folding from the first position to the second position, the airbag can be fastened quickly and easily to the housing in a defined manner.

The fixation is preferably sewn to the lug. A seam provides a safe fastening which can be formed within short time and with a strength adapted to different edge conditions.

The lug may include a fastening area provided for fastening the flexible fixation. Depending on the position at which the fixation is attached in said fastening area, a specific tensile stress can be adjusted in the tensioned state in the fixation. In this way, the tension acting between the flexible fixation and the airbag can be easily defined.

It is of advantage when the fixation is connected to the housing by means of a seam. Sewing the fixation to the housing ensures safe fastening of the fixation on the housing which can be formed quickly and at low cost. The selection of the thread and the type of seam helps to flexibly adapt the fastening strength of the seam to different requirements. In accordance with the invention, a seam may be formed of plural seams, which means that the invention is not limited to embodiments having merely one single seam.

In accordance with the invention, for achieving the aforementioned object also a method of mounting an airbag module, especially an airbag module according to the invention, is provided comprising the following steps:

a) An airbag is folded and inserted into a housing,
b) a fixation is fastened to the housing, and
c) by means of a tensioning device attached to the housing the fixation is brought into a tensioned state in which the airbag is fixed.

The order of the steps a) and b) is optional. The step c), however, is performed following the steps a) and b). In this way, the airbag module can be mounted within short time, wherein at the same time defined storage of the airbag with a specific tension between the fixation and the airbag is ensured.

Preferably, the fixation was sewn to the housing to safeguard secure fastening of the fixation on the housing which may further be inexpensive and adapted to the requirements.

BRIEF DESCRIPTION OF THE DRAWINGS

Further advantages and features will be evident from the following description in conjunction with the enclosed drawings, wherein.

DESCRIPTION

Figure 1:
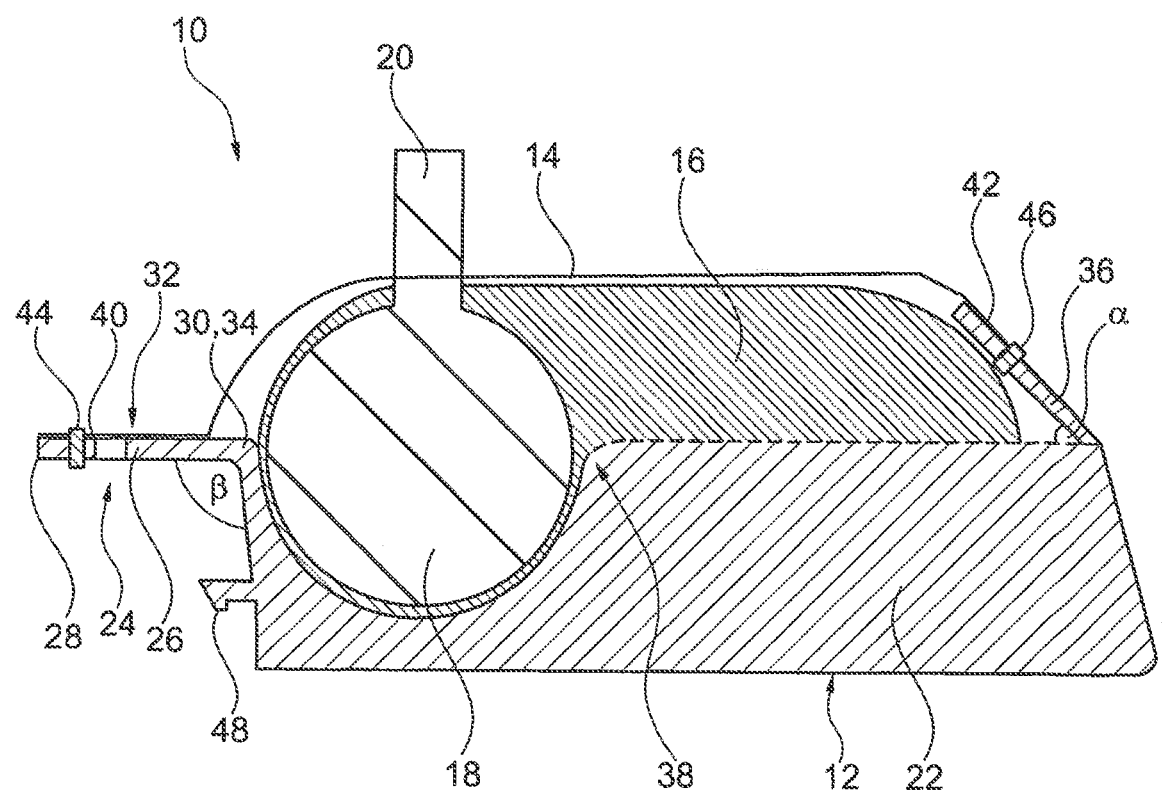
FIG. 1 shows, in a schematic view, an airbag module according to the invention having a fixation in the initial state.

FIG. 1 illustrates an airbag module 10 comprising a housing 12, a flexible fixation 14 fastened to the housing 12, a folded airbag 16 and an inflator 18 which provides gas for filling the airbag 16 in a case of release.

The folded airbag 16 and the inflator 18 are arranged between the housing 12 and the flexible fixation 14 and are fastened to the housing 12 by means of the fixation 14.

The inflator 18 has a fastening bolt 20 which is arranged opposite to the housing 12 and protrudes from the flexible fixation 14. In an alternative embodiment, the fastening bolt 20 can be arranged at a different position, especially opposite to the flexible fixation 14, and/or may be guided out of the housing 12.

The fastening bolt 20 may be provided for connecting the airbag module 10 to a device, especially a vehicle, which is configured to control the airbag module 10 and, resp., the inflator 18.

The housing 12 comprises a cover 22 having a tensioning device 24 which is arranged on a side of the cover 22.

The tensioning device 24 comprises a lug 26 having a first end 28, an opposite second end 30 as well as a fastening area 32 disposed between the first and second ends 28, 30. The second end 30 includes a hinge 34 by means of which the lug 26 is pivoted to the cover 22.

The housing 12 further includes a wing 36 which is provided on the cover 22 opposite to the tensioning device 24 and which projects from the cover 22 at an angle α of about 45°. Alternatively, the angle α may be of any size.

The wing 36 is designed to be stiff. In an alternative embodiment, the wing 36 may be pivoted to the cover 22 and/or may be flexible.

The folded airbag 16 is arranged, at least in portions, between the wing 36 and the cover 22.

The wing 36 is optional, i.e. in another alternative embodiment the housing 12 may be designed without the wing 36.

The cover 22 has a receiving portion 38 for the airbag 16 and the inflator 18 in which the airbag 16 and the inflator 18 are supported substantially by form closure.

The housing 12 is formed integrally, thus causing the cover 22, the tensioning device 24 and the wing 36 to be integrally connected to each other in the shown embodiment.

The hinge 34 is formed by a predetermined bending point within the housing 12.

The flexible fixation 14 includes a first fastening portion 40 and a second opposed fastening portion 42 by means of which the flexible fixation 14 is fastened to the housing 12.

The first fastening portion 40 is fixed on the fastening area 32 of the lug 26 by means of a first seam 44.

The second fastening portion 42 is fixed on the wing 36 by means of a second seam 46. As an alternative, the flexible fixation 14 may be fixed directly on the cover 22, especially by a seam, by means of the second fastening portion 42.

The flexible fixation 14 can be fixed, especially by a seam, to the housing 12 on one or both of the sides (not shown) each of which interconnects the first and second fastening portions 40, 42. In this case, the first and second seams 44, 46 may merge into each other, thus causing the flexible fixation 14 to be fixed on the housing 12 by one single seam.

The flexible fixation 14 is made from flat fabric material. Alternatively, the flexible fixation 14 may be formed by one or more strips or a net made from flexible material.

Figure 2:
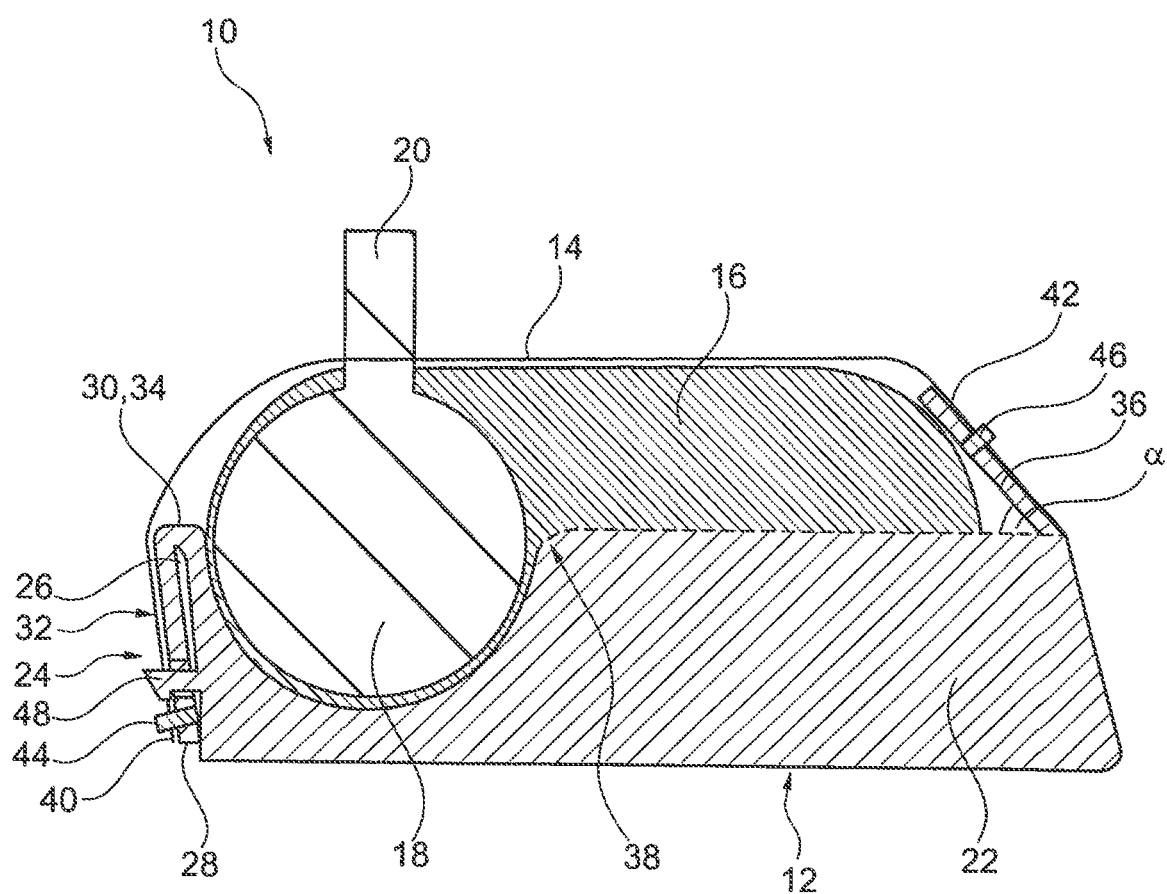
FIG. 2 shows, in a schematic view, the airbag module from FIG. 1 with the fixation in the tensioned state.

The tensioning device 24 can be adjusted from a first position in which the flexible fixation 14 is in an initial position (see FIG. 1) to a second position in which the flexible fixation 14 is in a tensioned state (see FIG. 2) by folding the lug 26 by means of the hinge 34. In doing so, the tensile stress acting between the first and second fastening portions 40, 42 is higher in the second position than in the first position.

When adjusting the tensioning device 24 from the first position to the second position, the lug 26 is pivoted about an angle β which is larger than 90°. Alternatively, the angle β may be of any size as long as the required tensile stress is reached in the flexible fixation 14 to provide the desired tension between the flexible fixation 14 and the airbag 16. Of preference, the angle β ranges from 10° to 180°, preferably from 45° to 135°, to ensure easy handling of the tensioning device 24 which permits quick adjustment of the tensioning device 24 from the first position to the second position.

The housing 12 includes a stop element 48 which is configured to fix the lug 26 in the second position. In this way, the lug 26 is prevented from inadvertently coming off and the flexible fixation 14 is prevented from loosening.

The lug 26 abuts on the housing 12 at least in portions in the second position. Thus, the airbag module 10 has an especially compact shape. Further, the tensioning device 24 substantially does not project from the housing 12, which prevents, for example when handling the airbag module 10, the lug 26 from being caught on something and prevents the tensioning device 24 from opening.

The tensioning device 24 is configured so that the lug 26 can be adjusted to the second position without using any tool, especially by using the lug 26 as a lever.

In order to mount and, resp., to manufacture the airbag module 10, at first the folded airbag 16 and the inflator 18 are inserted into the housing 12 by appropriately arranging the folded airbag 16 and the inflator 18 in the receiving portion 38.

Subsequently, the flexible fixation 14 is arranged above the receiving portion 38 and is fastened to the housing 12. In this way, the folded airbag 16 is arranged between the fixation 14 and the cover of the housing 12.

As an alternative, the flexible fixation 14 can be fastened to the housing 12 before the folded airbag 16 and/or the inflator 18 is/are inserted, as long as the folded airbag 16 and/or the inflator 18 are ensured to be properly introduced to the housing 12 when the flexible fixation 14 is already fastened on the housing 12.

For fastening the flexible fixation 14, the first fastening portion 40 is fixed on the fastening area 32 of the lug 26, with the lug 26 being in the first position.

The second fastening portion 42 is fixed on the housing 12, especially on the wing 36, opposite to the tensioning device 24.

Depending on how closely to the first end 28 the first fastening portion 40 is fastened on the fastening area 32, the tensile stress in the flexible fixation 14 and thus the tension by which the folded airbag 16 is fixed on the housing can be adjusted. Accordingly, the tensile stress between the first and second fastening portions 40, 42 in the second position is the higher, the smaller the distance of the first fastening portion 40 from the first end 28 of the lug 26. The first fastening portion 40 may also be fastened at the first end 28. As an alternative, the first fastening portion 40 may protrude from the first end 28 and/or may be folded at the first end 28, wherein the distance in said cases becomes correspondingly negative and the tensile stress will further increase. The first fastening portion 40 in these cases may be fastened, for example, on the side of the lug 26 which is arranged opposed to the fastening area 32.

Fastening of the fixation 14 is preferably performed by sewing the fixation 14 to the housing 12. As an alternative, the fixation 14 may be fastened on the housing 12 by material-locked, positive-locked and/or force-locked.

Ultimately, the tensioning device 24 is adjusted from the first position to the second position, thus causing the flexible fixation 14 to be brought into the tensioned state and the folded airbag 16 to be fixed on the housing 12 by means of the flexible fixation 14 while being tensioned in a defined manner.

In this way, there is provided an airbag module 10 having a simple structure and safeguarding defined storage of the folded airbag 16 without any additional fastening devices. Furthermore, the airbag module 10 can be mounted quickly and easily, especially without using any tools, by the method according to the invention, wherein a defined tension can be ensured by the tensioning device 24.

The invention claimed is:

1. An airbag module (10) comprising a housing (12), a folded airbag (16) and a flexible fixation (14) which fixes the folded airbag (16) on the housing (12), wherein a tensioning device (24) is provided by which the fixation (14) can be brought from an initial state to a tensioned state, wherein the fixation (14) is connected to the housing (12) by a seam (44, 46).

2. The airbag module according to claim 1, wherein the fixation (14) is made from fabric material.

3. The airbag module according to claim 1, wherein the tensioning device (24) includes a lug (26).

4. The airbag module according to claim 3, wherein the lug (26) is attached to the housing (12) by a hinge (34).

5. An airbag module (10) comprising a housing (12), a folded airbag (16) and a flexible fixation (14) which fixes the folded airbag (16) on the housing (12), wherein a tensioning device (24) is provided by which the fixation (14) can be brought from an initial state to a tensioned state, wherein the tensioning device (24) includes a lug (26), and wherein the fixation (14) is sewn to the lug (26).

6. The airbag module according to claim 5, wherein the fixation (14) is connected to the housing (12) by a seam (44, 46).

7. An airbag module (10) comprising a housing (12), a folded airbag (16) and a flexible fixation (14) which fixes the folded airbag (16) on the housing (12), wherein a tensioning device (24) is provided by which the fixation (14) can be brought from an initial state to a tensioned state, wherein the tensioning device (24) includes a lug (26), and wherein the lug (26) is fixed on a stop element (48).

8. The airbag module according to claim 7, wherein the fixation (14) is connected to the housing (12) by a seam (44, 46).

9. A method of mounting the airbag module (10) according to claim 1, comprising the following steps:
   a) folding an airbag (16) and inserting the airbag into a housing (12),
   b) fastening a fixation (14) on the housing (12), and
   c) bringing the fixation (14) to a tensioned state in which the airbag (16) is fixed by means of a tensioning device (24) which is attached to the housing (12), wherein the fixation (14) is sewn to the housing (12).

10. A method of mounting an airbag module (10), comprising the following steps:
   a) folding an airbag (16) and inserting the airbag into a housing (12),
   b) fastening a fixation (14) on the housing (12), and
   c) bringing the fixation (14) to a tensioned state in which the airbag (16) is fixed by means of a tensioning device (24) which is attached to the housing (12), wherein the fixation (14) is sewn to the housing (12).

* * * * *